United States Patent
Ramineni et al.

(10) Patent No.: US 9,361,350 B2
(45) Date of Patent: Jun. 7, 2016

(54) DATA TRANSFER BETWEEN FIRST AND SECOND DATABASES

(75) Inventors: Navin Kumar Ramineni, Pleasanton, CA (US); Pawan Nachnani, Newark, CA (US); Rajan Madhavan, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 559 days.

(21) Appl. No.: 12/732,267

(22) Filed: Mar. 26, 2010

(65) Prior Publication Data

US 2011/0238620 A1 Sep. 29, 2011

(51) Int. Cl.
*G06F 17/30* (2006.01)

(52) U.S. Cl.
CPC .................. *G06F 17/30578* (2013.01)

(58) Field of Classification Search
USPC .................................. 707/706, 612
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,389,429 B1 * | 5/2002 | Kane et al. | 707/609 |
| 6,393,605 B1 | 5/2002 | Loomans | |
| 6,405,220 B1 | 6/2002 | Brodersen et al. | |

(Continued)

OTHER PUBLICATIONS

U.S. Appl. No. 13/986,251, filed Apr. 16, 2013.

*Primary Examiner* — Amresh Singh
(74) *Attorney, Agent, or Firm* — Dergosits & Noah LLP; Todd A. Noah

(57) ABSTRACT

To facilitate data transfer between two databases, a transfer machine accesses both databases and finds matching records. The transfer machine determines and stores a match status of a record in one database. The match status indicates whether the record corresponds to at least one of the records in the other database, and if so, which record or records in the other database correspond to the record. If the match status indicates that the record matches a record in the other database, the transfer machine determines which record is current and updates the other record. If the match status indicates that a record has no match in the other database, the transfer machine adds a copy of the record to the other database.

21 Claims, 9 Drawing Sheets

(56) References Cited

U.S. PATENT DOCUMENTS

| | | |
|---|---|---|
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0083325 A1* | 6/2002 | Mediratta et al. ....... G06F 21/31 713/182 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0038823 A1* | 2/2005 | Wade et al. ................. 707/200 |
| 2005/0050555 A1 | 3/2005 | Exley et al. |
| 2005/0091098 A1 | 4/2005 | Brodersen et al. |
| 2007/0260611 A1* | 11/2007 | Bohannon et al. ............. 707/10 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0287746 A1* | 11/2009 | Brown ......................... 707/203 |
| 2010/0082842 A1* | 4/2010 | Lavrov et al. ................. 709/248 |
| 2010/0309933 A1* | 12/2010 | Stark et al. .................... 370/503 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jackobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

* cited by examiner

500

Search for New Leads

Enter Search Criteria

| | | |
|---|---|---|
| Keyword | purchasing | 510 |
| Industry | food-service | 512 |
| Company | *Donald* | 514 |
| Job Title | manager | 516 |
| Status | active | 518 |

[ Search ] 519

Search Results Found 520

- [X] Chun-Mei Liu
- [ ] Sondra V. Mitchell
- [X] Jim Deacon
- [X] Mary Mulino
- [X] J.T. Boxer

- [X] Karen Ravindra-O'Neill
- [X] Thomas R. Parsons
- [ ] Lex Luther
- [X] Marcus A. Watson
- [X] Kim Park

What would you like to do?

530 — [ Save Search ]

540 — [ Export Selected Results to Remote Database (CRM) ]

550 — [ Automatically Export New Matches to Remote Database (CRM) ]

*FIG. 5*

DATA TRANSFER BETWEEN FIRST AND SECOND DATABASES

TECHNICAL FIELD

The subject matter disclosed herein generally relates to the processing of data. Specifically, the present disclosure addresses systems and methods involving data transfer between a first database and a second database.

BACKGROUND

A database stores a body of data in one or more records. An example of a database is a contact information database that stores records corresponding to entities (e.g., business organizations or individual persons) able to receive communications, where the records contain information usable to address communications to the entities. Another example of a database is a customer relationship management (CRM) system that stores records corresponding to entities, where the records contain information usable to manage business relationships with the entities. Management of a business relationship with an entity may involve addressing a communication to that entity.

A record may store data in one or more data fields that organize the data within the record. Within a record, a data field may contain stored data (e.g., a phone number, an e-mail address, a mailing address, or other contact information), or the data field may be empty (e.g., storing no data, or storing null data). For example, a database may be a text file in a computer file system that is stored on a disk drive. Within the text file, a record may be one line of text terminated by a new-line character, and individual data fields may be separated by comma characters. Between comma characters, data within a data field may be a sequence of characters (e.g., a word, a phrase, or a number). Two adjacent comma characters may indicate an empty data field. As another example, a database may be a table (e.g., a spreadsheet) where each row of the table is a record and each column of the table is a data field.

Different databases may store identical or similar data in one or more data fields that are similar in purpose, if not necessarily similar in name or format. For example, one database may contain a record having a data field labeled as "Work Phone," while another database may contain a record having a data field labeled as "Business Phone." The two records in the two databases may correspond to a single individual person, and both data fields may contain the same data, namely, a business-related phone number for the person. As another example, a record in one database may contain a data field for a "Work Area Code" and a separate data field for a "Work Phone Number," while another record in another database may contain a single data field for a "Business Phone Number" that includes an area code.

Furthermore, the two data fields may contain different data. As an example, one data field in one database may contain a current phone number, and the other data field in the other database may contain an out-of-date phone number. As another example, one data field in one database may contain a current phone number, while the other data field in the other database may contain no phone number at all.

BRIEF DESCRIPTION OF THE DRAWINGS

Some embodiments are illustrated by way of example and not limitation in the figures of the accompanying drawings in which:

FIG. 5 is a layout diagram illustrating a search interface configured to receive a search query for the local database and provide search results from the local database, according to some example embodiments;

DETAILED DESCRIPTION

Figure 1:
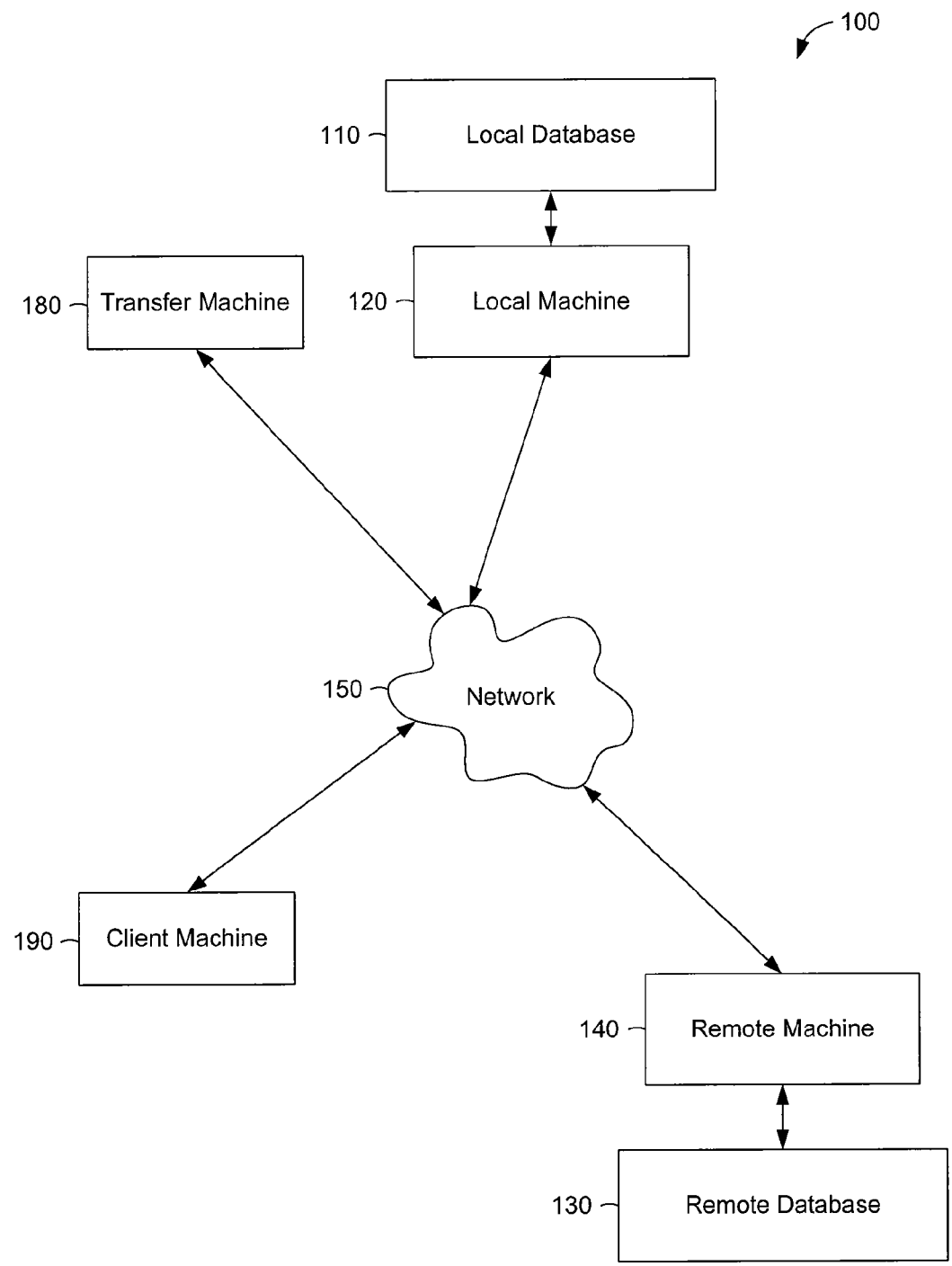
FIG. 1 is a network diagram illustrating a system that includes a transfer machine, a local database, and a remote database, according to some example embodiments.

Example methods and systems are directed to data transfer between a first database and a second database. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

To facilitate data transfer between a first database and a second database, a transfer machine accesses both databases and finds matching records. The first database may be a local database hosted by a local machine, and the second database may be a remote database hosted by remote machine. For example, the transfer machine may be operated by a provider of a contact information service that uses the local machine to maintain the local database, and the remote machine may be operated by a CRM service provider to maintain the remote database. As operated by the contact information service, the local database may contain records that store contact information for one or more entities. The remote database, as operated by the CRM service provider, may contain records that store information usable to manage business relationships with the one or more entities.

The transfer machine may use fuzzy matching techniques to identify the matching records. Access to the remote database requires authorization from a user of the remote database. The transfer machine obtains authorization from the user and accesses the remote database using the user's credentials (e.g., a username and a password). The matching records are a local record in the local database and a remote record in the remote database. The transfer machine determines and stores a match status of the remote record. The match status indicates whether the remote record corresponds to at least one of the records in the local database, and if so, which local record or records in the local database correspond to the remote record.

If the match status indicates that the remote record does match a record of the local database, the transfer machine determines whether the local record is current. If the local record is current and the remote record is not current (e.g., the remote record is out-of-date), the transfer machine updates the remote record using the local record. This update may be performed automatically (e.g., periodically, based on a preference setting of the user) or in response to a request from the user.

If the match status indicates that the remote record does not match a record of the local database, the transfer machine adds a copy of the remote record to the local database. Adding the copy of the remote record to the local database may be performed automatically (e.g., nightly, weekly, or monthly, based on a preference setting of the user) or in response to a request from the user. Checking for duplicate records may be performed by the transfer machine to avoid adding a duplicate record to the local database.

Moreover, the user may search for one or more records in the local database and request that a copy of a resulting local record be added to the remote database. In this situation, the transfer machine receives the user's search query and adds the copy of the local record to the remote database. The transfer machine may add the copy automatically or in response to a request from the user. Checking for duplicate records may be performed by the transfer machine to avoid adding a duplicate record to the remote database.

Furthermore, the transfer machine may present the user with summaries of the local and remote databases. In this situation, the transfer machine generates a summary of the local database (e.g., based on at least some of the local records) and a summary of the remote database (e.g., based on at least some of the remote records). The transfer machine provides the summaries to a client machine of the user for presentation to the user.

FIG. 1 is a network diagram illustrating a system 100 that includes a transfer machine 180, a first database in the example form of a local database 110, and a second database in the example form of a remote database 130, according to some example embodiments. The system 100 also includes a local machine 120 that maintains the local database 110 (e.g., provides access, updates records, and adds records), a remote machine 140 that maintains the remote database 130, and a client machine 190 of a user. The transfer machine 180, the local machine 120, the remote machine 140, and the client machine 190 are all connected via a network 150.

Any one or more of the machines (e.g., the transfer machine 180) in the system 100 may be implemented as a general-purpose computer that has been configured (e.g., programmed by software) to be a special-purpose computer to perform one or more of the methodologies described herein. An example of such a machine is discussed below with respect to FIG. 9. Furthermore, any two or more of the machines illustrated in FIG. 1 may be combined into a single machine, and the functions described herein for a single machine may be subdivided among multiple machines.

The network 150 may be any network that enables communication between machines (e.g., the local machine 120 and the remote machine 140). Accordingly, the network 150 may be a wired network, a wireless network, or any suitable combination thereof. The network 150 may include one or more portions that constitute a private network, a public network (e.g., the Internet), or any suitable combination thereof.

Figure 2:
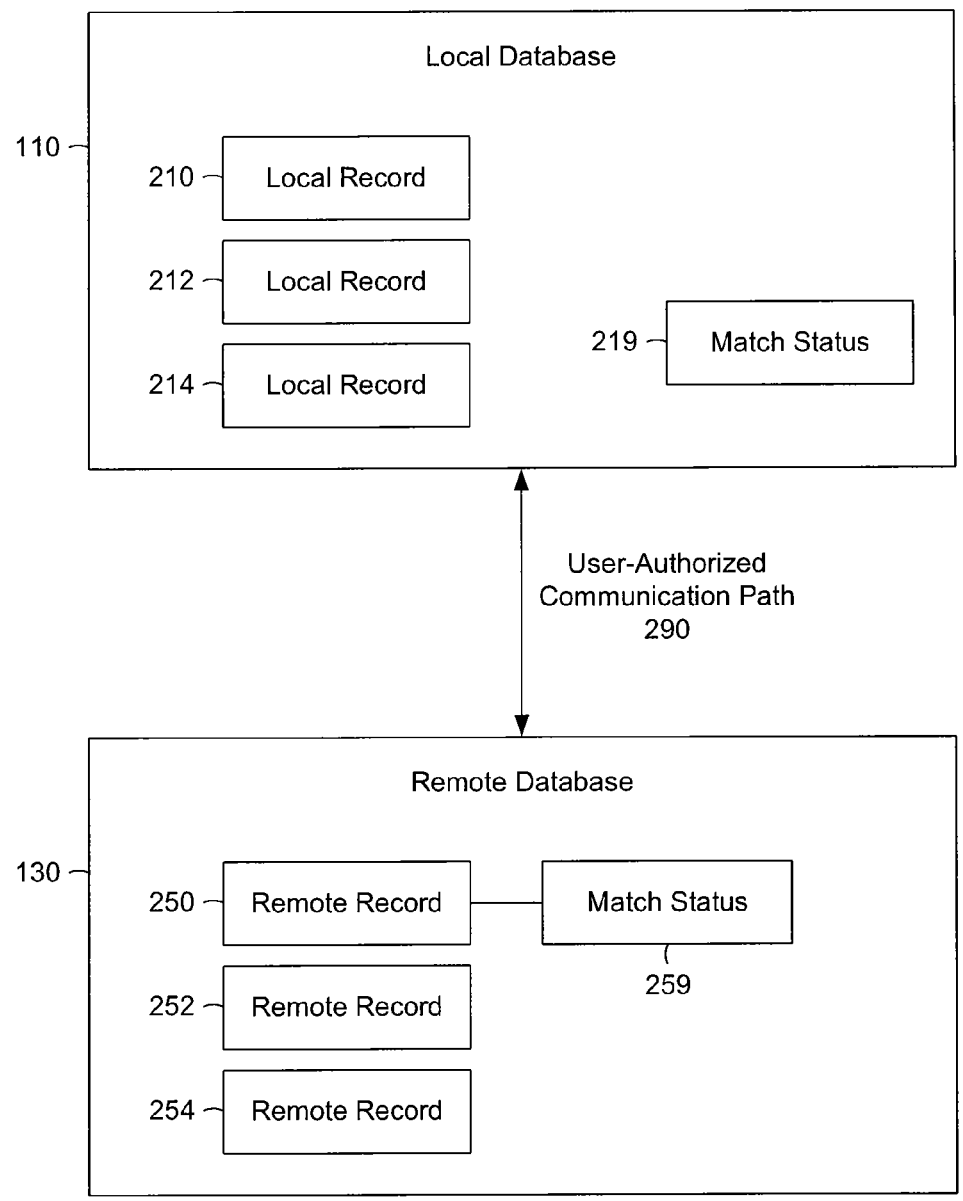
FIG. 2 is a block diagram of the local database and the remote database, according to some example embodiments.

FIG. 2 is a block diagram of the local database 110 and the remote database 130, according to some example embodiments. The local database 110 includes local records 210, 212, and 214. The remote database 130 includes remote records 250, 252, and 254.

A user-authorized communication path 290 connects the local database 110 and the remote database 130, thus allowing data transfer between the local database 110 and the remote database 130. The user-authorized communication path 290 is a communication path that has been authorized by a user, explicitly or implicitly, presently or previously, to allow communication between the local database 110 and the remote database 130. The user-authorized communication path 290 is implemented using one or more components of the system 100 (e.g., the local machine 120, the remote machine 140, and the network 150) and represents an authorization by the user of the client machine 190 to access the remote database 130 (e.g., using the user's credentials). For example, the user may provide the transfer machine 180 with a username and a password that, in combination, enable the transfer machine 180 to log in to the remote machine 140 as the user and access the remote database 130. As another example, the user may provide the authorization by agreeing to allow communication between the local database 110 and the remote database 130 (e.g., by confirming that the user has read the terms of service for the remote database 130, where the terms of service contain a suitable agreement provision). If the user has access to only some portion of the remote database 130 (e.g., access to only 500 records out of a total of 5 million records in the remote database 130), the transfer machine 180 has access to the same portion of the remote database 130.

The remote database 130 also stores a match status 259 of a particular remote record, namely, remote record 250. The remote database 130 may store the match status 259 as part of the remote record 250, as metadata of the remote record 250, or as a separate record of the remote database 130 (e.g., cross-referenced to the remote record 250). The local database 110 may store a match status 219 as well. For example, the locally stored match status 219 may be a copy of the match status 259 corresponding to the remote record 250. As another example, the match status 219 stored in the local database 110 may be metadata of the remote record 250 or a separate record of the local database 110 (e.g., cross-referenced to the remote record 250).

Figure 3:
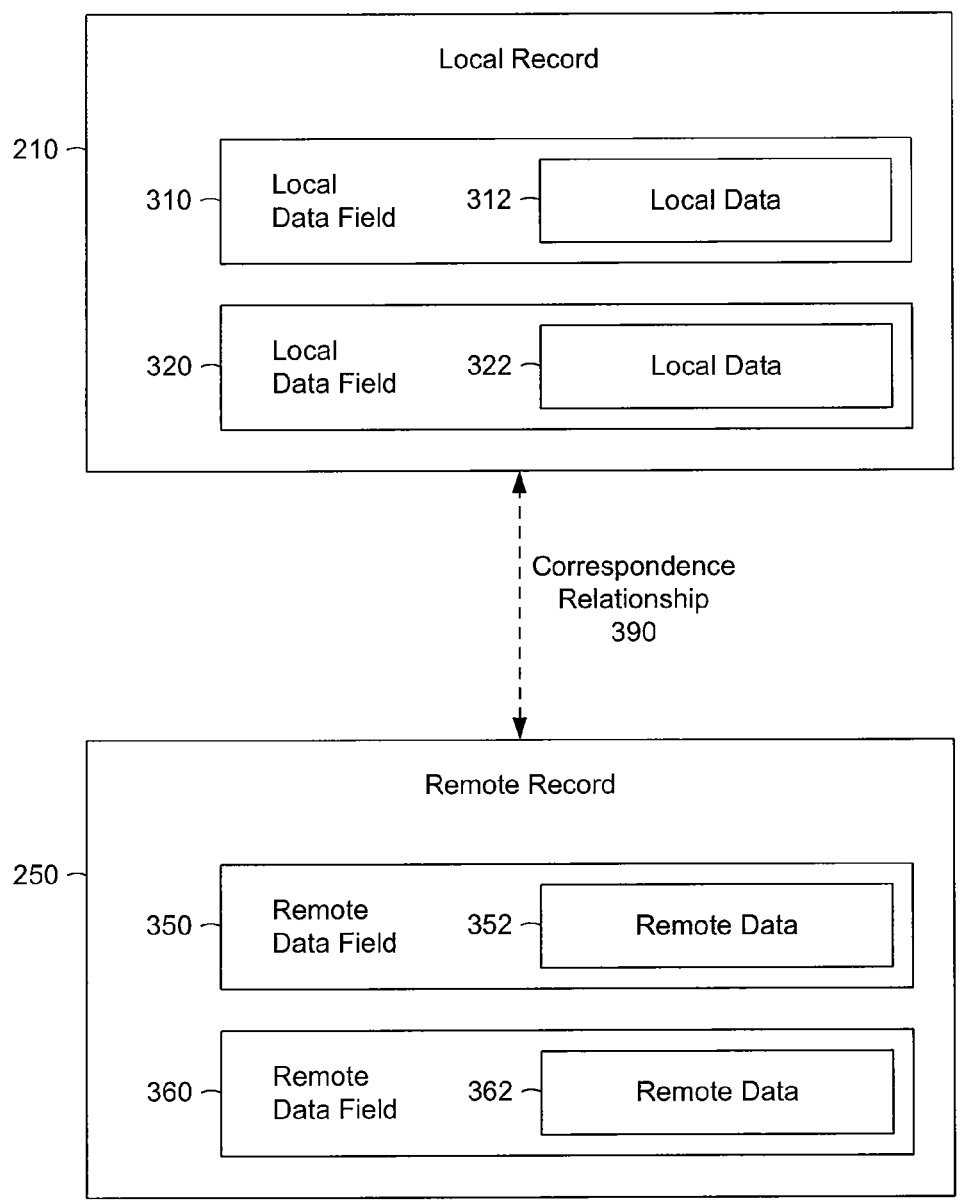
FIG. 3 is a block diagram of a local record of the local database and a corresponding remote record of the remote database, according to some example embodiments.

FIG. 3 is a block diagram of a local record 210 of the local database 110 and a corresponding remote record 250 of the remote database 130, according to some example embodiments. The local record 210 includes local data fields 310 and 320 that respectively store local data 312 and 322. Local data 312 may be of a particular data type (e.g., a personal email address, a business email address, a work phone number, a middle name, a company name, or a job title), and local data 322 may be of another data type. The remote record 250 includes remote data fields 350 and 360 that respectively store remote data 352 and 362. Remote data 352 may be of a particular data type, which may be of the same data type as local data 312. Similarly, remote data 362 may be of another data type.

The match status 259 of the remote record 250 may indicate that the remote record 250 corresponds to (e.g., matches) a record of the local database 110. In particular, the match status 259 may indicate that the remote record 250 corresponds to the local record 210. As discussed below, the correspondence between the remote record 250 and the local record 210 may be an identical match or a fuzzy match (e.g., based on a similarity score that transgresses a similarly threshold). A correspondence relationship 390 is shown in FIG. 3 to signify that the match status 259 indicates that the remote record 250 has been determined (e.g., by the transfer machine 180) to correspond to the local record 210.

Figure 4:
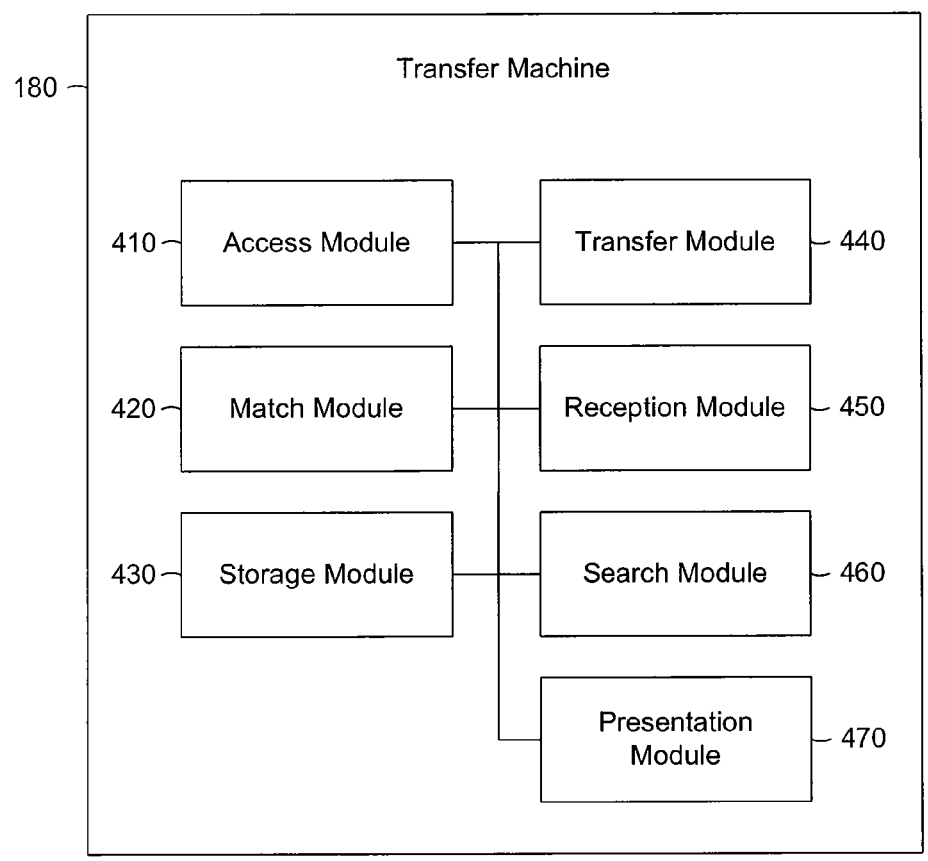
FIG. 4 is a block diagram of the transfer machine, according to some example embodiments.

FIG. 4 is a block diagram of the transfer machine 180, according to some example embodiments. The transfer machine 180 includes an access module 410, a match module 420, a storage module 430, a transfer module 440, a reception module 450, a search module 460, and a presentation module 470, all configured to communicate with each other (e.g., via a bus, a shared memory, or a switch). Any of these modules may be augmented using hardware, as described below with respect to FIG. 9. Moreover, any two or more of these modules may be combined into a single module, and the functions described herein for a single module may be subdivided among multiple modules.

The access module 410 accesses the local database 110 and the remote database 130, as well as authorization data (e.g., stored at the transfer machine 180 or at the client machine 190) of a user of the client machine 190. The access module 410 may access all or part of the local database 110 and all or part of the remote database 130. For example, the access module 410 may access the remote database 130 to the extent that records of the remote database 130 are accessible by the user of the client machine 190. To access the local database 110, the access module 410 communicates with the local machine 120 via the network 150. Similarly, to access the remote database 130, the access module 410 communicates with the remote machine 140 via the network 150.

The authorization data represents an authorization by the user to transfer data between the local database 110 and the remote database 130. The authorization data includes an authorization indicator (e.g., a permission flag or bit) that indicates the user has authorized the transfer of data. The remote machine 140 may allow the user to have access to the entirety of the remote database 130. Similarly, the local machine 120 may allow the user to have access to the entirety of the local database 110. However, the methodologies discussed herein also apply to situations where the user has limited or partial access to the remote database 130, the local database 110, or both.

Additionally, the authorization data includes authentication data (e.g., login credentials) that authenticates (e.g., verifies or validates) the user to the remote machine 140 for access to all or part of the remote database 130. The authentication data includes a username of the user and a password of the user, and the access module 410 uses the authorization data to access the remote database 130. Similarly, the authorization data may include further authentication data that authenticates the user to the local machine 120 for access to all or part of the local database 110.

The match module 420 determines the match status 259 of a remote record 250 in the remote database 130. As noted above, the match status 259 indicates whether the remote record 250 corresponds to at least one of the records (e.g., local record 210) in the local database 110, and if so, which local record or records correspond to the remote record 250. As noted above, the correspondence may be an identical match or a fuzzy match. An identical match occurs where the local data field 310 of a local record 210 contains local data 312 that is identical to remote data 352 of a remote record 250. The match module 420 may calculate a similarity score based on the local data 312 and the remote data 352, and accordingly determine that a fuzzy match exists where the similarity score transgresses (e.g., exceeds) a similarly threshold (e.g., a predefined value for the similarity score).

Moreover, the match module 420 determines whether a record (e.g., the local record 210 or the remote record 250) is current (e.g., updated with the most recent information available) or not current (e.g., out-of-date). For example, the match module 420 may determine that the local record 210 is current and that the remote record 250 is not current, based on a comparison of timestamps indicating when the local record 210 and the remote record 250 were last updated (e.g., by the user, or by an information service).

Furthermore, the match module 420 determines whether duplicate records exist in the remote database 130. For example, the match module 420 may determine that multiple remote records 250 and 252 in the remote database 130 correspond to the same local record 210 in the local database 110. Based on this, the match module 420 may determine that the multiple remote records 250 and 252 are duplicates of each other. Like all modules discussed herein, the match module 420 may be implemented using hardware (e.g., a processor of a machine), with or without software that configures the hardware.

The storage module 430 stores the match status 259 in the remote database 130 and stores another match status 219 (e.g., a copy of the match status 259 of the remote record 250) in the local database 110. The storage module 430 may store the authorization data at the transfer machine 180 (e.g., using a machine-readable storage medium of the transfer machine 180).

The reception module 450 receives one or more requests from the client machine 190. A request may be generated by the user of the client machine 190. For example, the client machine 190 may transmit a request to update a remote record 250 of the remote database 130 using a local record 210 of the local database 110 (e.g., using local data 312). As another example, the client machine 190 may transmit a request to copy a remote record 252 of the remote database 130 to the local database 110 (e.g., as a new record of the local database 110). As a further example, the client machine 190 may transmit a request to copy a local record 212 of the local database 110 to the remote database 130 (e.g., as a new record of the remote database 130). Any one or more of these requests may be received by the reception module 450. Furthermore, the reception module 450 may receive the authorization data (e.g., from the client machine 190).

The transfer module 440 initiates data transfer between the local database 110 and the remote database 130. In particular, the transfer module 440 may cause the remote machine 140 to modify the remote database 130, may cause the local machine 120 to modify the local database 110, or any suitable combination thereof. The behavior of the transfer module 440 may be based on the match status 259 of the remote record 250. For example, based on the match status 259, the transfer module 440 may cause the remote machine 140 to write a copy of local data 312 into a remote data field 350 of the remote record 250 (e.g., as an update of remote data 352).

As another example, based on the match status 259, the transfer module 440 may cause the local machine 120 to add a copy of a remote record 252 to the local database 110 (e.g., as a new record of the local database 110). Similarly, based on the match status 259, the transfer module 440 may cause the remote machine 140 to add a copy of a local record 212 to the remote database 130 (e.g., as a new record of the remote database 130).

The search module 460 receives a search query from the client machine 190. The search query may be generated by the user of the client machine 190, and the search query may include one or more search terms. For example, the user may generate a search for records in the local database 110 that match the search terms. The search module 460 performs a search based on the search query (e.g., based on the search terms) and provides search results to the client machine 190 in response to the search query. The search results may include a list of references to records in the local database 110, and the search module 460 may present the user (e.g., via the client machine 190) with an interface to request that one or more of the referenced records of the local database 110 be copied to the remote database 130.

The presentation module 470 generates one or more summaries of one or more databases. For example, the presentation module 470 may generate a first summary of the local database 110 and generate a second summary of the remote database 130. A summary presents aggregated information that summarizes at least part of a database. As an example, the user of the client machine 190 may have access to only a portion of the local database 110 (e.g., 50 local records out of 50,000 total local records), and the first summary may be generated based on that portion (e.g., the subset). Similarly, the user may have access to only a portion of the remote database 130 (e.g., 100 remote records out of 10,000 total remote records), and the second summary may be generated based on that portion (e.g., the 100 remote records). Moreover, a summary may be generated by the presentation module 470 based on a number of records, including, for example, a number of remote records that have a particular match status (e.g., matched or unmatched), a number of records determined to be current, a number of records determined to be not current (e.g., out-of-date), or a number of records updated during a period of time (e.g., a week, a month, or year). A summary may include a chart or graph, for example, a pie chart or a bar graph. The presentation module 470 provides the first and second summaries to the client machine 190 for presentation to the user.

FIG. 5 is a layout diagram illustrating a search interface 500 configured to receive a search query for the local database 110 and provide search results from the local database 110, according to some example embodiments. The search interface 500 includes search criteria fields 510-518, a search initiator button 519, search results 520, a search storage button 530, a results export button 540, and an automatic export button 550. The search module 460 causes the client machine 190 to display the search interface 500 to the user. For example, the search module 460 may transmit a web page that includes the search interface 500 to the client machine 190.

The search criteria fields 510-518 accept user-generated submissions of search terms (e.g., keywords), and the search initiator button 519 causes the client machine 190 to transmit the search terms to the search module 460 of the transfer machine 180. The search module 460 generates the search results 520 and provides the search results 520 to the client machine 190 in the search interface 500 (e.g., in the webpage that includes the search interface 500). As shown, the search results 520 include names of persons (e.g., contacts in a contact information database), and each name may be a reference (e.g., a hyperlink) to a record (e.g., record 210) of the local database 110. Selection boxes are shown adjacent to the names. The selection boxes constitute an interface to accept user-generated selections from the search results 520.

The search storage button 530 is operable by the user to save at least some of the information shown in the search interface 500. For example, if the user clicks on the search storage button 530, the transfer machine 180 may save the contents of the search criteria fields 510-518, the search results 520, and the status of the selection boxes (e.g., checked or unchecked) to a machine-readable storage medium at the transfer machine 180.

The results export button 540 is operable by the user to submit a request that the selected search results be copied to the remote database 130. For example, if the user clicks on the results export button 540, the transfer module 440 may cause the remote machine 140 to add a copy of a local record 212 to the remote database 130 (e.g., as a new record of the remote database 130). The automatic export button 550 is operable by the user to submit a persistent version of the request. As an example, if the user clicks on the automatic export button 550, the storage module 430 may store a user preference for automatic (e.g., unattended by the user) export of records in the local database 110 that match the search criteria fields 510-518. The user preference may be stored at the transfer machine 180. Based on the stored user preference, the transfer machine 180 may identify a new local record (e.g., local record 214) in the local database 110, determine that the new local record matches the search criteria fields 510-518, and cause the remote machine 140 to add a copy of the new local record to the remote database 130.

Figure 6:
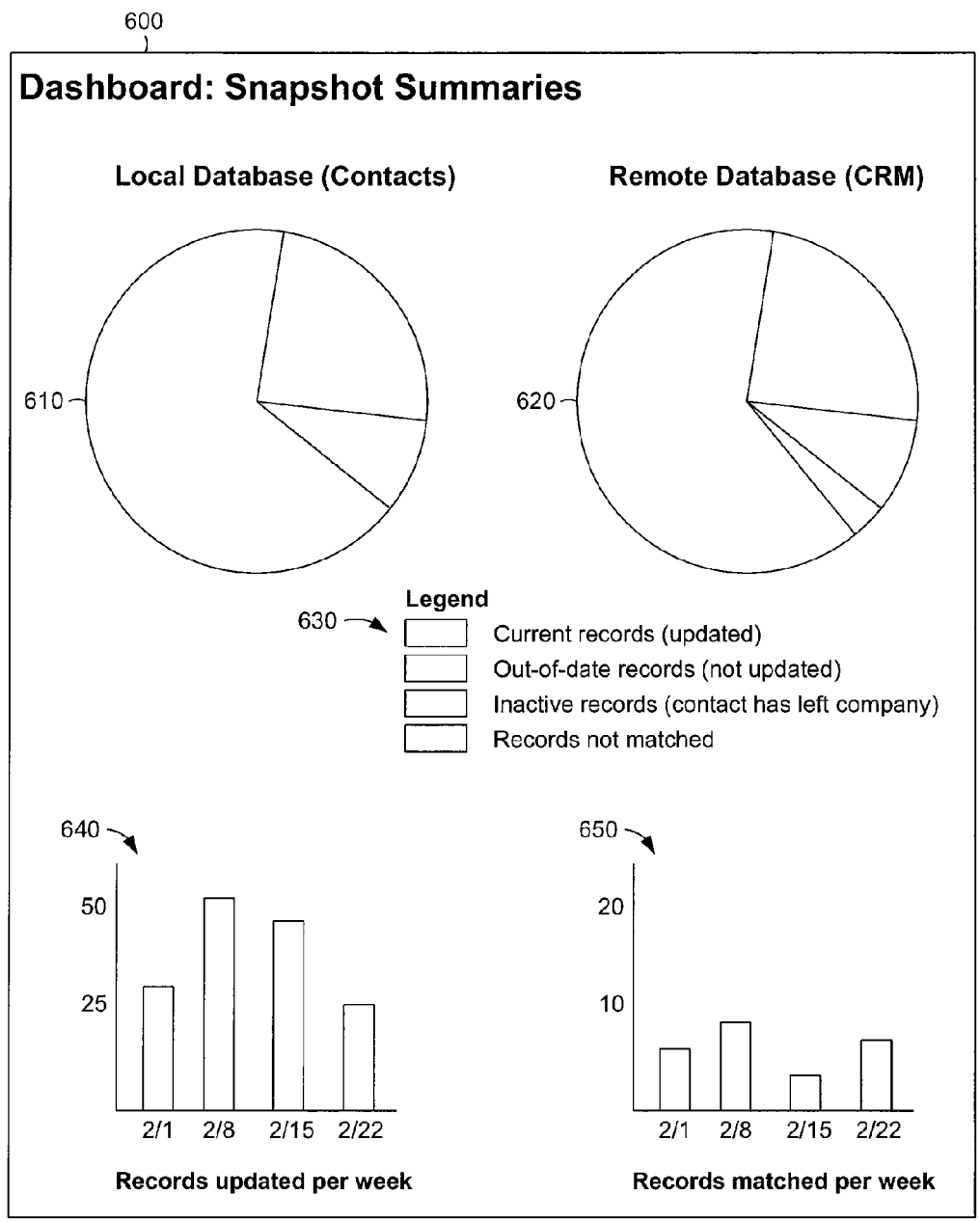
FIG. 6 is a layout diagram illustrating a presentation interface configured to present summaries of the local and remote databases.

FIG. 6 is a layout diagram illustrating a presentation interface 600 configured to present summaries 610, 620, 640, and 650 of the local and remote databases 110 and 130. The presentation interface 600 includes a first summary 610 in the example form of a pie chart depicting the local database 110, a second summary 620 in the example form of a pie chart depicting the remote database 130, a legend 630, a third summary in the example form of a bar graph based on the local database 110, and a fourth summary in the example form of a bar graph based on the remote database 130.

The first summary 610 depicts proportions of the local database 110 that include current local records, out-of-date local records, inactive local records, and unmatched local records. Similarly, the second summary 620 depicts proportions of the remote database 130 that include current remote records, out-of-data remote records, active remote records, and unmatched remote records. As shown in the legend 630, current records are records determined (e.g., by the match module 440) to be updated with the most recent information available (e.g., to the transfer machine 180). In contrast, out-of-date records are records determined (e.g., by the match module 440) to be not updated with the most recent information available. The unmatched records are records in one database (e.g., the local database 110) that have a match status (e.g., match status 259) indicating no correspondence relationship with any records in another database (e.g., the remote database 130). Inactive records are records determined (e.g., by the match module 440) to contain inaccurate information (e.g., remote data 362), and hence, in some example embodiments may be considered a subset of the out-of-date records. For example, the inactive records may be archived records in a contact information database that are also unmatched to any records in a CRM system.

Figure 7:
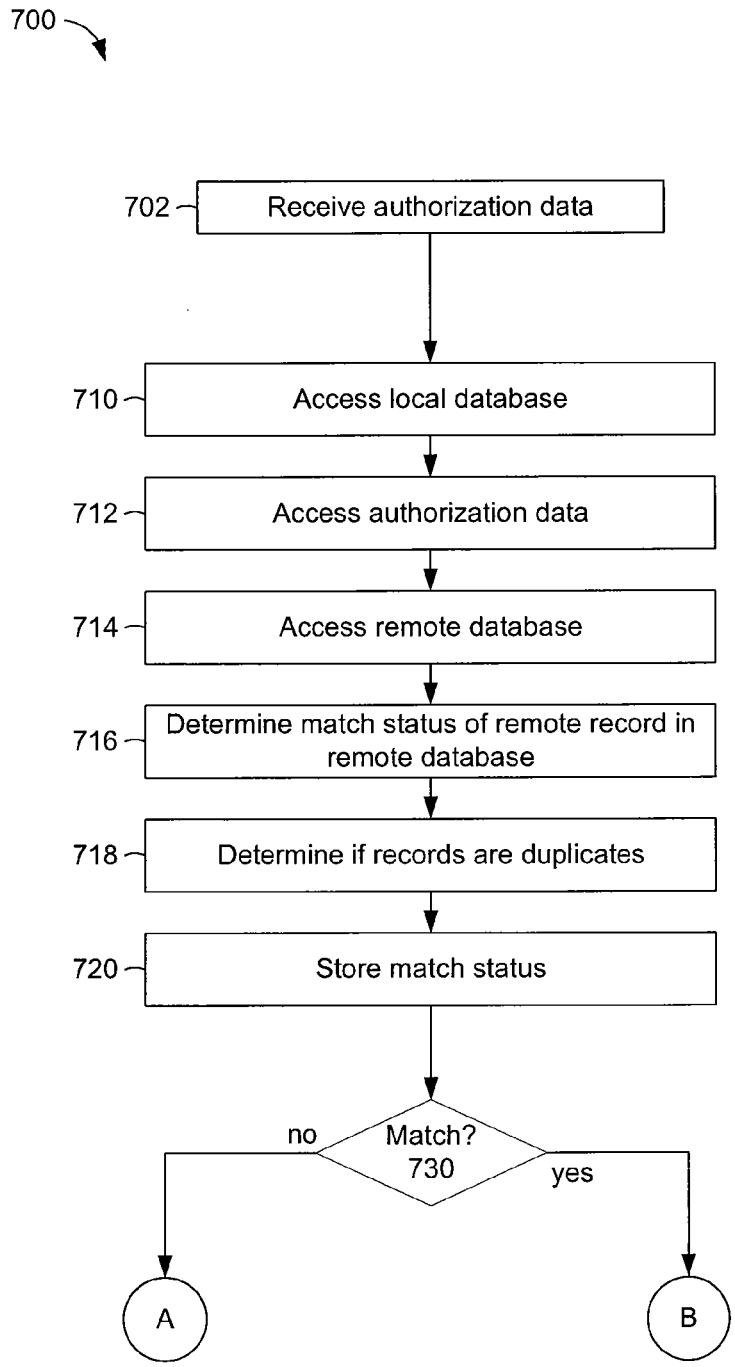
FIG. 7-8 are flowcharts illustrating a method of data transfer between the local database and the remote database.
Figure 8:
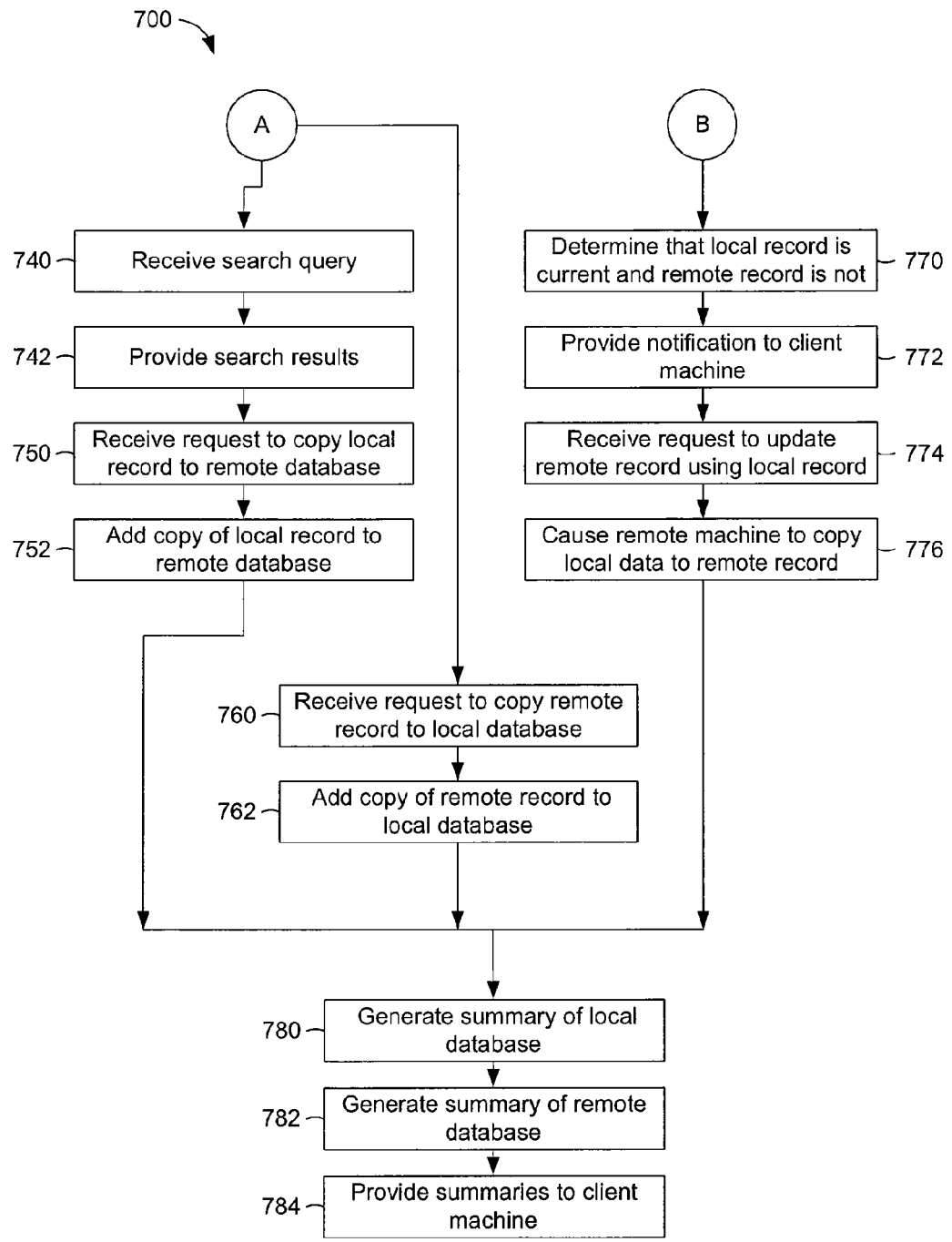

FIG. 7-8 are flowcharts illustrating a method 700 of data transfer between the local database 110 and the remote database 130. The method 700 includes operations 702-784 and may be performed by modules of the transfer machine 180.

At operation 702, the reception module 450 of the transfer machine 180 receives the authorization data from the client machine 190 (e.g., as submitted by the user). As noted above, the authorization data represents an authorization by the user to transfer data between the local database 110 and the remote database 130.

The access module 410 of the transfer machine 180 performs operations 710-714. At operation 710, the access module 410 accesses the local database 110. In accessing the local database 110, the access module 410 may read one or more local records (e.g., local record 210). At operation 712, the access module 410 accesses the authorization data (e.g., stored at the transfer machine 180). At operation 714, the access module 410 accesses the remote database 130. In accessing the remote database 130, the access module 410 may read one or more remote records (e.g., remote record 250).

At operation 716, the match module 420 of the transfer machine 180 determines the match status 259 of a remote record 250 in the remote database 130. As noted above, the match status 259 is indicative of whether the remote record 250 corresponds to at least one of the records (e.g., local record 210) in the local database 110.

At operation 718, the match module 420 determines whether duplicate records exist in the remote database 130. As noted above, the match module 420 may determine that two or more remote records (e.g., remote records 250 and 252) of the remote database 130 are duplicates of each other, where the two or more remote records each have a match status (e.g., match status 259) indicating a correspondence relationship with the same local record (e.g., local record 210) in the local database 110.

At operation 720, the storage module 430 of the transfer machine 180 stores the match status 259 in the remote database 130 and stores another match status 219 (e.g., a copy of the match status 259 of the remote record 250) in the local database 110.

At operation 730, the method 700 flows to branch A if the match status 259 of the remote record 250 indicates that no local record in the local database 110 corresponds to the remote record 250. If the match status 259 indicates that the remote record 250 corresponds to a local record (e.g., local record 210), the method 700 flows to branch B. This flow control may be performed by a processor of the transfer machine 180, based on the determination of the match status 259 performed in operation 716.

Branches A and B of the method 700 are shown in FIG. 8. In branch A, the remote record 250 does not correspond to any local record in the local database 110. In some example embodiments, the user may submit a search query to search for local records (e.g., local record 210) in the local database 110. In operation 740, the search module 460 of the transfer machine 180 receives a search query from the client machine 190. As noted above, the search query may include one or more search terms (e.g., search criteria fields 510-518).

In operation 742, the search module 460 performs a search based on the search query (e.g., based on the search criteria fields 510-518) and provides search results 520 to the client machine 190 in response to the search query. As noted above, the search results 520 may include a list of references to local records in the local database 110. Moreover, the search module 460 may present the user (e.g., via the client machine 190) with an interface to request that one or more of the referenced records of the local database 110 be copied to the remote database 130.

In operation 750, the reception module 450 of the transfer machine 180 receives a request (e.g., from the user) to copy a local record 212 of the local database 110 to the remote database 130 (e.g., as a new record of the remote database 130). In operation 752, the transfer module 440 of the transfer machine 180 causes the remote machine 140 to add a copy of the local record 212 to the remote database 130.

In various example embodiments, operations 740-752 may be performed regardless whether the match status 259 of the remote record 250 indicates that no local record of the local database 110 corresponds to the remote record 250. In other words, although operations 740-752 are shown in FIG. 8 as part of branch A of the method 700, the operations 740-752 may be executed at any point in the method 700. Moreover, the operations 740-752 may be executed as a standalone method independent of the method 700.

Alternatively, in branch A of the method 700, the user may submit a request to copy the remote record 250 of the remote database 130 to the local database 110 (e.g., as a new record of the local database 110). For example, the local machine 120 may communicate to the user (e.g., via the client machine 190) that the user is to receive a reward in exchange for submission of a new record to the local database 110. In operation 760, the reception module 450 receives the request to copy the remote record 250 to the local database 110, and in operation 762, the transfer module 440 causes the local machine 120 to add a copy of the remote record 250 to the local database 110. Operation 762 may be executed automatically on a periodic basis (e.g., repeated daily, nightly, weekly, monthly, quarterly, or yearly), based on a preference setting of the user.

In branch B of the method 700, the match status 259 indicates that the remote record 250 corresponds to a local record 210 in the local database 110. In operation 770, the match module 420 determines that the local record 210 is current and that the remote record 250 is not current (e.g., based on timestamps of the records 210 and 250). In operation 772, the match module 420 provides a notification to the user via the client machine 190 to communicate that the local record 210 is current, that the remote record 250 is not current, or both.

The user may respond to this notification by submitting a request to the reception module 450 via the client machine 190. In operation 774, the reception module 450 receives a request (e.g., from the user) to update the remote record 250 of the remote database 130 using local data 312 of the local record 210. In operation 776, the transfer module 440 causes the remote machine 140 write a copy of the local data 312 into a remote data field 350 of the remote record 250 (e.g., as an update of remote data 352 stored in the remote data field 350). Operation 776 may be executed automatically on a periodic basis (e.g., repeated daily, nightly, weekly, monthly, quarterly, or yearly), based on a preference setting of the user.

Furthermore, according to the method 700, the presentation module 470 of the transfer machine 180 performs operations 780-784. In operation 780, the presentation module 470 generates a local summary (e.g., first summary 610) of the local database 110, and in operation 782, the presentation module 470 generates a remote summary (e.g., second summary 620) of the remote database 130.

In operation 784, the presentation module 470 provides one or more summaries (e.g., first and second summaries 610 and 620) to the client machine 190 for presentation to the user.

According to various example embodiments, the methodologies discussed herein may enable the transfer machine 180, with authorization from the user, to identify corresponding (e.g., identically matching or nearly matching) records in two different databases maintained by two different machines, even if the different databases are maintained by different entities (e.g., different data service providers). With corresponding records identified, the transfer machine 180 is able to update (e.g., synchronize) one record with information from its corresponding record in the other database, as well as add records from one database to another database. In identifying the corresponding records, transfer machine 180 may relieve the user of considerable expenditures of time and effort used to visually scan database records and mentally compare data stored therein to determine which records are current. Moreover, the transfer machine 180 may relieve the user of spending further time and effort performing manual data entry activities to copy information from one database to another.

Figure 9:
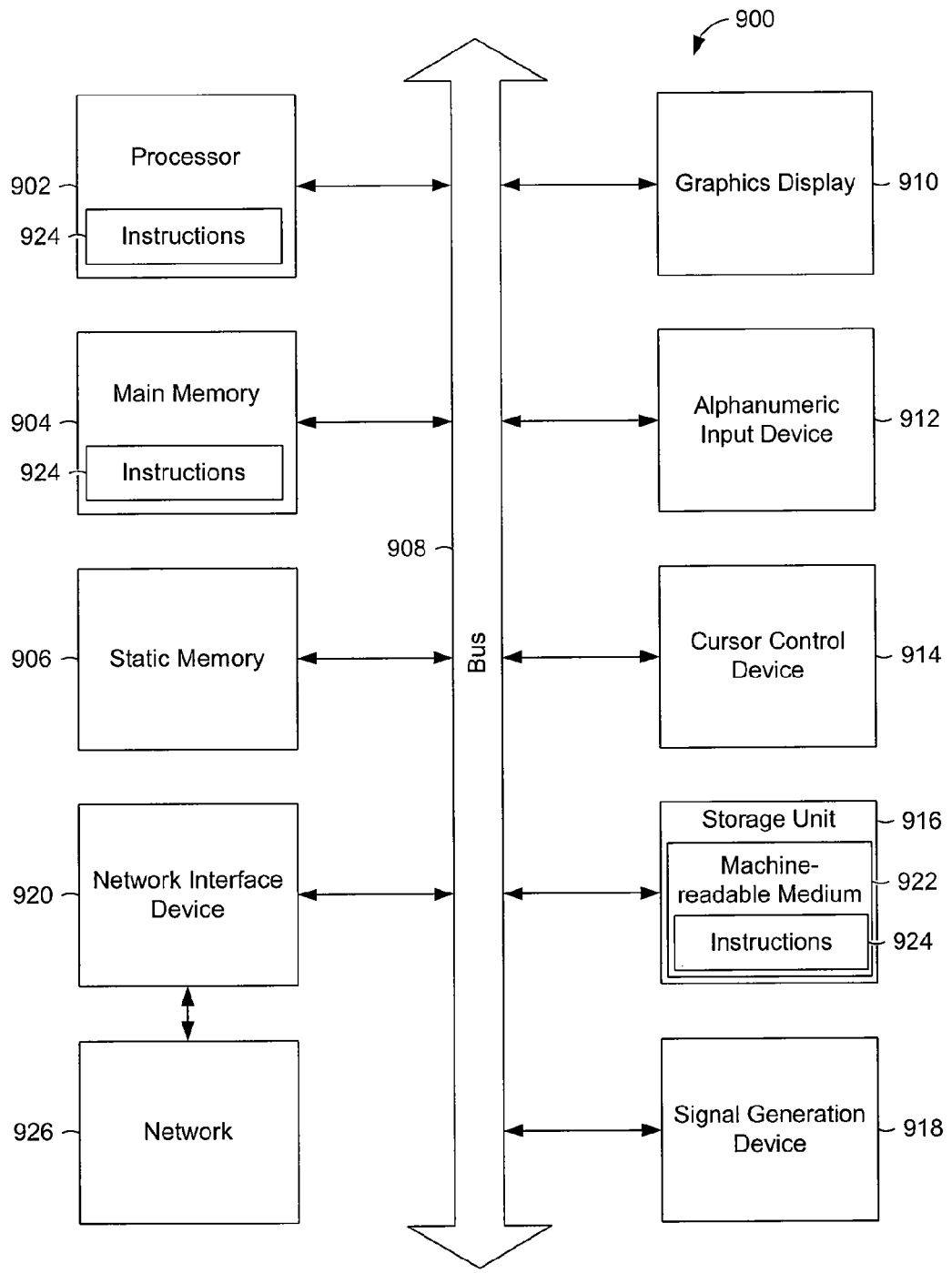
FIG. 9 is a block diagram illustrating components of a machine, according to some example embodiments, able to read instructions from a machine-readable medium and perform any one or more of the methodologies discussed herein.

FIG. 9 illustrates components of a machine 900, according to some example embodiments, that is able to read instructions from a machine-readable medium (e.g., machine-readable storage medium) and perform any one or more of the methodologies discussed herein. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924 (sequentially or otherwise) that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by machine 900. Accordingly, the main memory 904 and the processor 902 may be considered as machine-readable media. The instructions 924 may be transmitted or received over a network 926 (e.g., network 150) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., software) for execution by the machine, such that the instructions, when executed by one or more processors of the machine (e.g., processor 902), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Moreover, unless specifically stated otherwise, the terms "first," "second," "third," and the like do not necessarily imply an order or sequence. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
   accessing, by a transfer machine, a first database hosted by a first machine in response to a request identifying authorization data, the first database including a first plurality of records, the first plurality of records including a first record that includes a first data field of a data type from a plurality of data types per record, the data type corresponding to the request;
   accessing, by the transfer machine, the authorization data identified in the request, the authorization data representing an authorization by a user to transfer data between the first database and a second database hosted by a second machine communicatively coupled to the first machine via a network, wherein the authorization data represents the user's credentials and defines the user's scope of access to the second database, the second machine being remote with respect to the first machine;
   accessing, by the transfer machine, the second database using the authorization data, the second database including a second plurality of records, the second plurality of records including a second record that includes a second data field of the data type from a plurality of data types per record;
   determining, by the transfer machine, match statuses of the first and second records based on the first data field of the first record and the second data field of the second record, the match statuses being indicative of whether the first record corresponds to a least one of the second plurality of records or the second record corresponds to at least one of the first plurality of records, the match statuses comprising a fuzzy match, the determining of the match statuses being performed using a processor of the transfer machine;
   storing, by the transfer machine, the match statuses of the first and second records, wherein each match status is a data record that is stored separate from the first record and the second record, the storing including storing a copy of the match status on each of the first machine and the second machine;

determining, by the transfer machine, which record in the first database and in the second database is most current for at least one pair of corresponding first and second records based on a comparison of a first timestamp indicating when the first record was last updated and a second timestamp indicating when the second record was last updated;

identifying, by the transfer machine, the first record for updating the second record in response to a determination that the first timestamp is most current; and identifying, by the transfer machine, the second record for updating the first record in response to a determination that the second timestamp is most current.

2. The computer-implemented method of claim 1 further comprising:

receiving the authorization data from a client machine of the user; wherein:

the authorization data includes authentication data of the user;

the authentication data authenticates the user to the second machine for access to the second database; and the client machine is communicatively coupled to at least one of the first machine or the second machine.

3. The computer-implemented method of claim 1, wherein:

the match status of the second record indicates that the second record does correspond to the first record;

the first data field stores first data of the data type; and the method further comprises causing the second machine to write a copy of the first data into the second data field.

4. The computer-implemented method of claim 3, wherein:

a client machine of the user transmits a request to update the second record using the first record;

the causing of the second machine to write the copy is responsive to the request; and the method further comprises receiving the request from the client machine.

5. The computer-implemented method of claim 3, wherein:

the second data field stores second data of the data type; and the method further comprises determining that the first data is current and that the second data is not current.

6. The computer-implemented method of claim 1, wherein:

the match status indicates that the second record does not correspond to any of the first plurality of records;

a client machine of the user transmits a request to copy the second record to the first database; and the method further comprises:

receiving the request from the client machine; and causing the first machine to add a copy of the second record to the first database.

7. The computer-implemented method of claim 1, wherein: the match status of the first record indicates that the first record does not correspond to any of the second plurality of records; and the method further comprises causing the second machine to add a copy of the first record to the second database.

8. The computer-implemented method of claim 7, wherein:

a client machine of the user transmits a request to copy the first record to the second database;

the causing of the second machine to add the copy is responsive to the request; and the method further comprises receiving the request from the client machine.

9. The computer-implemented method of claim 8 further comprising:

receiving a search query from the client machine; and providing search results in response to the search query; wherein:

the search results include a reference to the first record; and the causing of the second machine to add the copy is based on the reference to the first record.

10. The computer-implemented method of claim 1 further comprising:

generating a first summary of the first database;

generating a second summary of the second database; and providing the first and second summaries to a client machine for presentation at the client machine.

11. The computer-implemented method of claim 10, wherein at least one of the first summary or the second summary is based on a parameter selected from a group consisting of:

a first number of records that have a particular match status;

a second number of records determined to be current;

a third number of records determined to be not current; and a fourth number of records updated during a period of time.

12. The computer-implemented method of claim 1, wherein:

the match status of the second record is a first match status;

the second plurality of records includes a third record having a second match status;

the first match status indicates that the second record corresponds to the first record;

the second match status indicates that the third record corresponds to the first record; and the method further comprises:

determining that the second and third records are duplicate records.

13. The computer-implemented method of claim 1, wherein determining the match status includes at least one of:

determining that first data stored in the first data field is identical to second data stored in the second data field, whereby the match status is determined to be an identical match;

determining that a similarity score calculated based on the first data and on the second data transgresses a similarity threshold to indicate a correspondence between the first and second records, whereby the match status is determined to be a fuzzy match; or determining that the similarity score does not transgress the similarity threshold, whereby the match status is determined to be unmatched.

14. A system comprising:

a processor-based application, which when executed on a computer having one or more processors, will cause the one or more processors to:

access, by a transfer machine, a first database hosted by a first machine in response to a request identifying authorization data, the first database including a first plurality of records, the first plurality of records including a first record that includes a first data field of a data type from a plurality of data types per record, the data type corresponding to the request;

access, by the transfer machine, the authorization data identified in the request, the authorization data representing of an authorization by a user to transfer data between the first database and a second database hosted by a second machine communicatively coupled to the first machine via a network, wherein the authorization data represents the user's credentials and defines the user's scope of access to the second database, the second machine being remote with respect to the first machine;

access, by the transfer machine, the second database using the authorization data, the second database including a second plurality of records, the second plurality of records including a second record that includes a second data field of the data type from a plurality of data types per record;

determine, by the transfer machine, match statuses of the first and second records based on the first data field of the first record and the second data field of the second record, the match statuses being indicative of whether the first record corresponds to a least one of the second plurality of records or the second record corresponds to at least one of the first plurality of records, the match statuses comprising a fuzzy match, the determining of the match statuses being performed using a processor of a machine, wherein a most current record in the first database and in the second database is determined for at least one pair of corresponding first and second records based on a comparison of a first timestamp indicating when the first record was last updated and a second timestamp indicating when the second record was last updated, identify, by the transfer machine, the first record for updating the second record in response to a determination that the first timestamp is most current, and identify, by the transfer machine, the second record for updating the first record in response to a determination that the second timestamp is most current; and store, by the transfer machine, the match statuses of the first and second records, wherein each match status is a data record that is stored separate from the first record and the second record, the storing including storing a copy of the match status on each of the first machine and the second machine.

15. The system of claim 14, wherein:
the match status indicates that the second record corresponds to the first record;
the first data field stores first data of the data type; and the system further comprises
a transfer module to cause the second machine to write a copy of the first data into the second data field.

16. The system of claim 15, wherein:
a client machine of the user transmits a request to update the second record using the first record;
the transfer module is to cause the second machine to write the copy in response to the request; and the system further comprises
a reception module to receive the request from the client machine.

17. The system of claim 14, wherein:
the match status indicates that the second record does not correspond to any of the first plurality of records;
a client machine of the user transmits a request to copy the second record to the first database; and the system further comprises:
a reception module to receive the request from the client machine; and
a transfer module to cause the first machine to add a copy of the second record to the first database.

18. The system of claim 14, wherein:
the match status of the first record indicates that the first record does not correspond to any of the second plurality of records; and the system further comprises
a transfer module to cause the second machine to add a copy of the first record to the second database.

19. The system of claim 18, wherein:
a client machine of the user transmits a request to copy the first record to the second database;
the transfer module is to cause the second machine to add the copy in response to the request; and the system further comprises
a reception module to receive the request from the client machine.

20. A non-transitory machine-readable storage medium comprising instructions that, when executed by one or more processors of a machine, cause the machine to perform a method comprising:

accessing, by a transfer machine, a first database hosted by a first machine in response to a request identifying authorization data, the first database including a first plurality of records, the first plurality of records including a first record that includes a first data field of a data type from a plurality of data types per record, the data type corresponding to the request;

accessing, by the transfer machine, the authorization data identified in the request, the authorization data representing an authorization by a user to transfer data between the first database and a second database hosted by a second machine communicatively coupled to the first machine via a network, wherein the authorization data represents the user's credentials and defines the user's scope of access to the second database, the second machine being remote with respect to the first machine;

accessing, by the transfer machine, the second database using the authorization data, the second database including a second plurality of records, the second plurality of records including a second record that includes a second data field of the data type from a plurality of data types per record;

determining, by the transfer machine, match statuses of the first and second records based on the first data field of the first record and the second data field of the second record, the match statuses being indicative of whether the first record corresponds to a least one of the second plurality of records or the second record corresponds to at least one of the first plurality of records, the match statuses comprising a fuzzy match, the determining of the match statuses being performed using a processor of the transfer machine;

storing, by the transfer machine, the match statuses of the first and second records, wherein each match status is a data record that is stored separate from the first record and the second record, the storing including storing a copy of the match status on each of the first machine and the second machine;

determining, by the transfer machine, which record in the first database and in the second database is most current for at least one pair of corresponding first and second records based on a comparison of a first timestamp indicating when the first record was last updated and a second timestamp indicating when the second record was last updated;

identifying, by the transfer machine, the first record for updating the second record in response to a determination that the first timestamp is most current; and identifying, by the transfer machine, the second record for updating the first record in response to a determination that the second timestamp is most current.

21. The non-transitory machine readable storage medium of claim 20, wherein:
the method further comprises:
generating a first summary of the first database;
generating a second summary of the second database; and
providing the first and second summaries to a client machine for presentation at the client machine;
at least one of the first summary or the second summary is based on a parameter selected from a group consisting of:
a first number of records that have a particular match status;
a second number of records determined to be current;
a third number of records determined to be not current; and
a fourth number of records updated during a period of time; and
the determining of the match status includes at least one of:
determining that first data stored in the first data field is identical to second data stored in the second data field, whereby the match status is determined to be an identical match;
determining that a similarity score calculated based on the first data and on the second data transgresses a similarity threshold to indicate a correspondence between the first and second records, whereby the match status is determined to be a fuzzy match; or
determining that the similarity score does not transgress the similarity threshold, whereby the match status is determined to be unmatched.

* * * * *